(12) United States Patent  (10) Patent No.: US 8,152,205 B2
Asakawa  (45) Date of Patent: Apr. 10, 2012

(54) STAINLESS-STEEL FITTING FOR RESIN TUBES

(75) Inventor: Mamoru Asakawa, Shizuoko-ken (JP)

(73) Assignee: Ihara Science Corporation, Tokyo (JP)

( * ) Notice: Subject to any disclaimer, the term of this patent is extended or adjusted under 35 U.S.C. 154(b) by 362 days.

(21) Appl. No.: 11/216,016

(22) Filed: Sep. 1, 2005

(65) Prior Publication Data

US 2007/0046022 A1    Mar. 1, 2007

(51) Int. Cl.
    *F16L 13/14* (2006.01)
(52) U.S. Cl. .......................... 285/382.7; 285/342
(58) Field of Classification Search .............. 285/255, 285/386, 354, 247, 334.1–334.5, 382.7, 342
    See application file for complete search history.

(56) References Cited

U.S. PATENT DOCUMENTS

| | | | | |
|---|---|---|---|---|
| 68,348 A * | 9/1867 | Buchanan | ...................... | 285/247 |
| 969,216 A * | 9/1910 | Stephens | ...................... | 285/247 |
| 1,064,154 A * | 6/1913 | Miller | ............................ | 285/255 |
| 2,289,382 A * | 7/1942 | Parker | ........................ | 285/332.3 |
| 2,333,909 A * | 11/1943 | Williams | ...................... | 285/342 |
| RE23,137 E * | 7/1949 | Hobbs | ............................ | 285/95 |
| 2,768,845 A * | 10/1956 | Samiran | ...................... | 285/331 |
| 3,218,094 A * | 11/1965 | Bauer | ........................ | 285/382.7 |
| 3,532,365 A * | 10/1970 | Kronschnabel | .............. | 285/258 |
| 3,746,376 A * | 7/1973 | Gold | ............................ | 285/334.2 |
| 3,834,743 A * | 9/1974 | Strybel | ........................ | 285/382.7 |
| 4,162,802 A * | 7/1979 | Cox | ............................ | 285/382.7 |
| 4,500,118 A * | 2/1985 | Blenkush | .................... | 285/247 |
| 4,775,171 A * | 10/1988 | Marshall | .................... | 285/101 |
| 4,790,569 A * | 12/1988 | Chaffee | ........................ | 285/40 |
| 4,848,804 A * | 7/1989 | Weigl | ........................... | 285/52 |
| 4,940,263 A * | 7/1990 | Mayernik | .................... | 285/342 |
| 4,946,200 A * | 8/1990 | Blenkush et al. | ............. | 285/38 |
| 5,284,368 A * | 2/1994 | Oetiker et al. | ................ | 285/81 |
| 5,388,871 A * | 2/1995 | Saitoh | .......................... | 285/247 |
| 5,470,113 A * | 11/1995 | Schwalm et al. | ............. | 285/255 |
| 6,193,239 B1 * | 2/2001 | Fukano et al. | ............... | 277/615 |

(Continued)

FOREIGN PATENT DOCUMENTS

DE            3147050 A1 *  6/1983

(Continued)

OTHER PUBLICATIONS

Japanese Office Action issued on Nov. 25, 2008, Japanese Application No. 2003-436085.

*Primary Examiner* — Aaron Dunwoody

(74) *Attorney, Agent, or Firm* — Young & Thompson

(57) ABSTRACT

A stainless-steel fitting for resin tubes, which easily and securely connects resin tubes and is also inexpensive, is provided. Resin tube (9) is inserted into insert part (8), provided on fitting main body (1); nut (3) is screwed onto fitting main body (1) and sleeve (2) is moved; in the pipe fitting which presses and locks resin tube (9) between insert part (8) and sleeve (2), a step part, composed of large diameter part (2a) and small diameter part (2b), is formed on the outer surface of the sleeve part (2); the length of small diameter part (2b) is that wherein the end-face of the small diameter part (2b) protrudes outward from nut (3), when sleeve (2) is inserted into nut (3); and nut (3) and sleeve (2) are integrated by pressing and spreading the inner diameter of this end-face.

5 Claims, 1 Drawing Sheet

U.S. PATENT DOCUMENTS

| | | | |
|---|---|---|---|
| 6,409,222 B1 * | 6/2002 | Donoho et al. | 285/93 |
| 6,412,832 B1 * | 7/2002 | Donoho et al. | 285/334.5 |
| 6,435,568 B1 * | 8/2002 | Fukano et al. | 285/331 |
| 6,695,355 B1 * | 2/2004 | Giuffre | 285/255 |
| 6,776,440 B2 * | 8/2004 | Nishio | 285/331 |
| 6,877,777 B1 * | 4/2005 | Wartluft | 285/255 |
| 6,991,266 B2 * | 1/2006 | Nishio | 285/331 |
| 7,014,216 B2 * | 3/2006 | Mittersteiner et al. | 285/247 |
| 7,240,925 B2 * | 7/2007 | Fukano et al. | 285/247 |
| 2004/0217589 A1 * | 11/2004 | Mittersteiner et al. | 285/255 |
| 2006/0157975 A1 * | 7/2006 | Fujii et al. | 285/247 |
| 2006/0244256 A1 * | 11/2006 | Hyobu et al. | 285/247 |

FOREIGN PATENT DOCUMENTS

| | | |
|---|---|---|
| JP | 2000-170969 | 6/2000 |
| JP | 2003-227590 | 8/2003 |
| JP | 2005-164018 | 6/2005 |

* cited by examiner

STAINLESS-STEEL FITTING FOR RESIN TUBES

TECHNICAL FIELD

The present invention relates to a stainless-steel fitting for resin tubes used in semiconductor manufacturing devices.

BACKGROUND ART

In semiconductor manufacturing machines, fluids such as clean-air, purified water, temperature-controlled water, organic chemicals and the like are used. Resin tubes, such as fluororesin tubes, polyurethane tubes, nylon tubes and the like, are used as pipes for carrying these fluids, and stainless-steel fittings are used as fittings for connecting these resin tubes, taking into consideration oil content and impurity countermeasures. Currently, double ferrule-type stainless-steel fittings are heavily used as fittings for resin tubes.

In the Non-Patent Reference 1, below, a pipe fitting, which comprises a fitting main body having an insert part, a sleeve which is provided movable on the outer-side of the insert part, and a nut which screws onto the fitting main body and moves the sleeve, wherein a protrusion part is provided on the outer-side of the insert part, the pipe is inserted into the insert part, the nut is screwed onto the fitting main body and the sleeve is moved to the outer-side of the protrusion part and presses and locks the pipe fitting, is described.

[Non-Patent Reference 1] Nitta Moore Company pamphlet, "Chemifit CS Series"

DISCLOSURE OF THE INVENTION

The following problems exist when using a double ferrule-type stainless-steel fitting, the former described in Background Art, on very soft resin tubes.

(a) Because reactive force from the tube could not be obtained, tube-holding power of the ferrule is weak, the tube rotates easily, and the resistance towards pull-out of the tube is low.

(b) Although tube inserts are sometimes used in order to resolve problem (a), above, in this case, the tube may be cut off whereby the ferrule is interlocked with the tube.

(c) Because the degree to which the nut, which fastens the ferrule, is tightened is the number of rotations from the position to which the nut has been tightened manually, the degree of tightening is not clear with regards to tubes.

(d) There are four components (fitting main body, nut, front ferrule and back ferrule), and maintenance and handling is troublesome.

(e) There are two ferrules, and if the sequential order of attachment is mistaken, there is risk of fluid leakage and tube pull-out.

The pipe fitting, the later in the Background Art, has problems such as mistaken insertion direction of the sleeve when inserting the sleeve into the nut, falling sleeve depending on the connection direction to the pipe, and the like.

The present invention has been achieved in order to resolve the foregoing issues, and an object of the invention is to provide a stainless-steel fitting for resin tubes which easily and securely connects resin tubes and is also inexpensive.

The present invention is characterized by a pipe fitting comprising a fitting main body having an insert part, a sleeve, and a nut which is screwed onto the fitting main body and presses the sleeve, wherein the insert part comprises an outer surface having an outer diameter which is about the same as the inner diameter of a resin tube to be inserted and a protrusion part having an outer diameter which is larger than the outer surface, the sleeve comprises an inner surface having an inner diameter which is slightly larger than the outer diameter of the said resin tube to be inserted, the tube is inserted into an insert part, the nut is screwed onto the fitting main body and the sleeve is moved, and the tube is pressed and locked between the insert part and sleeve, wherein a step part, composed of a large diameter part and a small diameter part, is formed on the outer surface of the sleeve, the length of the small diameter part is such that the end-face of the small diameter part protrudes outward from nut when sleeve is inserted into nut, and nut and sleeve are integrated by pressing and spreading the inner diameter of this end-face. Through this, the sleeve can rotate freely within the nut and can be prevented from getting pulled out of (separated from) the nut.

The Effects of the Invention (a) Because the stainless-steel fitting according to the present invention consolidated the number of components into two components (fitting main body and assembly nut), maintenance and handling is facilitated.

(b) Because the assembly nut according to the present invention can be manufactured easily, it is superior cost.

(c) Because the inner diameter of the end-face of the sleeve has been widened in the present invention, insertion of the tube is facilitated, and further, damage to the tube due to swinging thereof can be prevented.

(d) Because the degree to which the nut is tightened is determined to be the position wherein it reaches the fitting main body, the degree of tightening is defined.

(e) Pull-out of the tube is prevented by pressure bonding of the tube between the sleeve and the insert part, and therefore, the holding power of the tube is strong and, in addition, because no part of the tube has been interlocking, there is no risk of the tube being cut off.

BRIEF DESCRIPTION OF THE DRAWINGS

In the accompanying drawings.

BEST MODES FOR CARRYING OUT THE INVENTION

The best mode for carrying out the present invention is described, based on one embodiment, with reference to the drawings.

Figure 1:
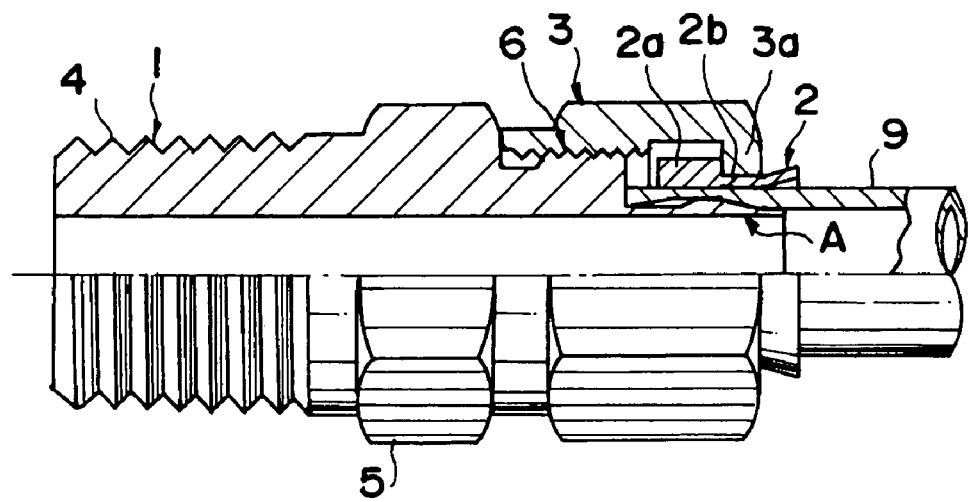
FIG. 1 is a partial longitudinal cross-sectional view of a fitting according to the present invention.

The stainless-steel fitting according to one embodiment of the present invention comprises a fitting main body 1, a sleeve 2, and a nut 3, as shown in FIG. 1.

Figure 2:
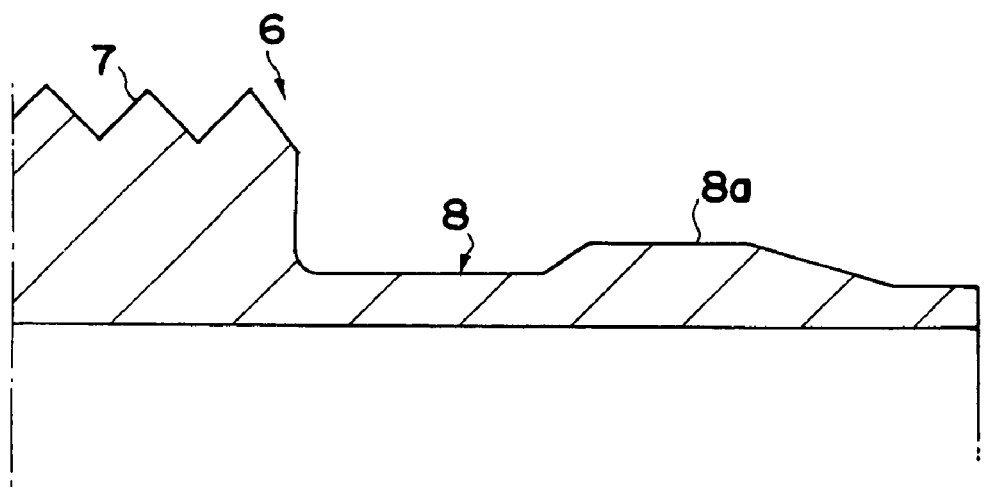
FIG. 2 is an enlarged fragmentary cross-sectional view thereof in the region indicated by A in FIG. 1.

The fitting main body 1 comprises a male screw part 4 which is screwed into devices and the like, wrench hooking part 5, and pipe connection part 6 for connecting resin tube 9. The side-face of the wrench hooking part 5 is an opposing surface which opposes the side-face of nut 3, described hereafter. Although the construction on the other side of the pipe connection part 6 is the male screw part, it is not limited thereto, and can be a socket part, pipe connection part and the like. The pipe connection part 6 comprises a male screw part 7 to which nut 3 is screwed and an insert part 8, which extends in the axis direction from the end-face of the male screw part 7, as shown in FIG. 2. The insert part 8 has a cylindrical shape and has an outer diameter which is about the same as the inner diameter of the resin tube 9. A protrusion part 8a with a trapezoidal cross-section is formed in the circumferential direction near its center. Resin tube 9 can be inserted into this insert part 8 to the end-face of the male screw part 7.

Sleeve 2 has an inner surface, of which the inner diameter is slightly larger than the outer diameter of resin tube 9, and an inclined plane which extends outward is formed on the inner surface, on the left-hand side in the drawing. A step part, of which the male screw part side is a large diameter part 2a and the other side is a small diameter part 2b, is formed on the outer surface of the sleeve 2, and the outer diameter of this large diameter part 2a is smaller than the inner diameter of the female screw in nut 3.

Nut 3 has a female screw part which screws into the male screw part 7 of fitting main body 1 on its inner surface and an inner diameter which is slightly larger than the outer diameter of small diameter part 2b of sleeve 2, and a pressing part 3a, which locks with the step part of sleeve 2 and enables sleeve 2 to move, is formed.

The length of the smaller diameter part 2b of sleeve 2 is such that the end-face of the small diameter part 2b of sleeve 2 protrudes outward from the pressing part 3a of nut 3 when sleeve 2 is inserted into nut 3. Nut 3 can rotate freely within nut 3 and can be prevented from getting pulled out of (separated from) nut 3, by pressing and spreading the inner diameter of this end-face by a press.

In a state wherein the assembly nut formed from integrating this nut 3 and sleeve 2 is screwed into the male screw part 7 of the fitting main body 1 and the side-face of nut 3 is in contact with the side-face of the wrench hooking part 5 of the fitting main body part 1, the protrusion part 8a with a trapezoidal cross-section of the insert part 8 and the large diameter part 2a of sleeve 2 oppose each other via resin tube 9.

Next, the connection method for the stainless-steel fitting for resin tubes and the resin tubes is described.

(a) Selection of Fitting and Resin Tubes

Based on the type of fitting and the inner diameter and outer diameter of the tube 9 to be used, a fitting main body 1 and assembly nut, formed from nut 3 and sleeve 2, which matches therewith are selected. The connection-side end part of the resin tubes 9 are cut at a right angle with a sharp cutting tool.

(b) Insertion of Resin Tube

When the assembly nut is inserted into tube 9, tube 9 is inserted into the insert part 8 of the fitting main body 1 and the end-face of the tube 9 comes into contact with the end-face of the male screw part 7 of the fitting main body 1.

(c) After the assembly nut is moved to the fitting main body 1-side and nut 3 is fastened onto the male screw part 7 of the fitting main body 1, it is tightened with a wrench until the side-face of the assembly nut reaches the side-face of the wrench hooking part 5 of the fitting main body part 5. At this time, a back-up wrench is hooked onto the wrench hooking part 5 of the fitting main body 1 and fixed. Through this, a suitable degree of tightening of nut 3 can be attained. Resin tube 9 is pressed between the protrusion part 8a of insert part 8 and sleeve 2, and is tightly sealed and locked to the fitting main body 1.

(d) Re-Use of the Fitting Main Body and the Assembly Nut

After the assembly nut has been loosened and the resin tube 9 pulled out from the insert part 8 of the fitting main body 1, these can be re-used by cutting the resin tube 9 at the location excluding the deformed part of its end-face and performing the assembly from the foregoing (b), onward.

The following experiment was conducted using the stainless-steel fitting for resin tubes according to the present invention.

(a) Tubes Used

Size: diameter (phai) 4×diameter (phai) 2.5, diameter (phai) 6×diameter (phai) 4, diameter (phai) 8×diameter (phai) 6, diameter (phai) 12×diameter (phai) 8, and diameter (phai) 18×diameter (phai) 12

Materials: polyurethane, Teflon®, and nylon (b) Air-Proof Test

No leakage when tube usage pressure is increased two-folds by N2 gas (visual).

No He (1.5 MPa) leakage of the fitting part due to repeated bending.

(c) Tension Test

No problems until tube stretching occurs or at over 200 N.

(d) Internal Pressure Breakage

No pull-out until tube breakage

1 Fitting main body part
2 Sleeve
2a Large diameter part
2b Small diameter part
3 Nut
3a Pressing part
4 and 7 Male screw part
5 Wrench hooking part
6 Pipe connection part
8 Insert part
8a Protrusion part
9 Resin Tube

The invention claimed is:

1. A connection, comprising:
a resin tube (9);
a stainless-steel fitting main body (1) having an insert part (8);
a sleeve (2); and
a nut (3),
wherein the insert part (8) has a male screw part (7) and a generally cylindrical shape with an outer surface having an outer diameter which is about the same as an inner diameter of the resin tube (9), the insert part (8) further having a protrusion part (8a) formed with a trapezoidal quarter section in a circumferential direction near the protrusion part's center, the protrusion part (8a) having an outer diameter which is larger than said outer surface, said insert part (8), said protrusion part (8a) and said fitting main body (1) being a single piece,
the sleeve (2) having an inner surface having an inner diameter which is larger than an outer diameter of the resin tube (9),
said insert part (8) being inserted into said resin tube (9) such that a surface of the protrusion part (8a) contacts the resin tube (9) such that the resin tube (9) is pressed between the protrusion part (8a) and the sleeve (2) and locked to the fitting main body (1),
said nut (3) being screwed onto the fitting main body (1) and moving the sleeve (2), whereby the resin tube (9) is pressed and locked between the insert part (8) and sleeve (2),
a step part, composed of a first diameter part (2a) and a second diameter part (2b) smaller than the first diameter part, being formed on an outer surface of the sleeve (2), the length of said second diameter part (2b) being such that an end-face of the second diameter part (2b) protrudes outward from said nut (3) when the sleeve (2) is inserted into the nut (3), the nut (3) and the sleeve (2) are integrated by pressing and spreading an inner diameter of said end-face, and the protrusion part (8a) and the first diameter part (2*a*) are opposing when in contact with a side-face of a wrench hooking part in the fitting main body.

2. The connection according to claim 1, wherein, when said sleeve (2) and nut (3) are integrated, the nut (3) is screwed onto the fitting main body (1), and a side-face of the nut (3) being such that the protrusion part (8*a*) in said insert part (8) and the first diameter part (2*a*) in the sleeve (2) are opposing, when in contact with a side-face of the wrench hooking part in the fitting main body (1).

3. The connection according to claim 1, wherein said nut (3) has a female screw part which screws into the male screw part (7) of the fitting main body (1) and the nut (3) has an inner diameter which is larger than the outer diameter of the second diameter part (2*b*) of the sleeve (2), and a pressing part (3*a*), which locks with a step part of the sleeve (2) and enables the sleeve (2) to move.

4. The connection according to claim 1, wherein the fitting body comprises a plurality of recesses at one side of the protrusion part (8*a*).

5. The connection according to claim 1, wherein the nut (3) is flared.

\* \* \* \* \*